United States Patent [19]

Raymond

[11] 4,240,446
[45] Dec. 23, 1980

[54] VINE CROP HARVESTER

[76] Inventor: Robert J. Raymond, 956 Diamond Dr., Santa Maria, Calif. 93454

[21] Appl. No.: 959,461

[22] Filed: Nov. 13, 1978

[51] Int. Cl.³ .......................................... A01D 45/00
[52] U.S. Cl. ................... 130/30 R; 99/640; 130/30 C; 130/30 G; 99/640
[58] Field of Search ............... 130/30 R, 30 C, 30 G; 56/327 R

[56] References Cited

U.S. PATENT DOCUMENTS

| | | | |
|---|---|---|---|
| 746,714 | 12/1903 | Lasiter | 99/640 |
| 2,588,764 | 3/1952 | Richmond | 56/327 R |
| 2,601,055 | 6/1952 | Rahal | 99/640 |
| 2,707,982 | 5/1955 | Magnuson | 99/640 |
| 2,927,616 | 3/1960 | Brunier | 99/640 |
| 3,103,240 | 9/1963 | Minera | 99/640 |
| 3,387,611 | 6/1968 | Looker | 56/DIG. 1 |
| 3,566,881 | 3/1971 | Link | 56/327 R |
| 3,678,677 | 7/1972 | Miller et al. | 56/327 R |
| 3,746,267 | 7/1973 | Myers et al. | 241/46.11 |
| 3,868,062 | 2/1975 | Cunningham et al. | 241/36 |

Primary Examiner—Paul J. Hirsch

[57] ABSTRACT

A vine crop harvester which includes cleaning or picking rolls sufficiently close to grip and feed the stalks, the rolls being intermittently reversed to back up the stalk portions having enlarged asymmetrical branch joints and permit free chance rotation of the stalks so that, when the rolls are again actuated for forward feeding movement, these stalk joints will have their less thick cross-sections presented to the bights of the rolls for passage therebetween.

7 Claims, 10 Drawing Figures

VINE CROP HARVESTER

FIELD OF THE INVENTION

The invention is particularly adapted for use in connection with vine crops such as bell peppers and pimento peppers and other vine or stalk crops of roughly similar size and other physical characteristics. It can be used to remove outer wrapper leave of head lettuce.

KNOWN PRIOR ART

Prior art presently known comprises the following U.S. patent Nos:

| | | | |
|---|---|---|---|
| May 20, 1958 | R. M. Magnuson | | 2,835,295 |
| July 17, 1973 | Myers et al | | 3,746,267 |
| Oct. 10, 1972 | Lundin et al | | 3,697,005 |
| June 11, 1968 | G. R. Tillotson | | 3,387,612 |
| Jan. 5, 1971 | Olin L. Looker | | 3,552,398 |
| Feb. 25, 1975 | Cunnington et al | | 3,868,062 |

Vine or crop stalk harvesters, which have one or more pairs of rollers for pulling the vine stalks between them to dislodge the fruit when it meets the rollers, have the disadvantage that readily and frequently they can become clogged. The rollers or rolls are close enough together to grip and feed the stalks between them. As they feed through, the rollers pull the fruit up against them and detach the fruit, which is diverted or conveyed to a suitable harvesting container. However, some crops, bell peppers and pimento peppers, for example, comprise stalks or stems with branches. The juncture of the branches with the main stalk or stem are characterized by enlarged joints which are asymmetrical in cross-section. Usually the joint has a greater cross-sectional dimension in a plane passing through the main stem and the branch than in a plane at right angles thereto. Should the joint enter the bight of the rolls with its greater dimension lying transversely to the rolls, it will be unable to pass and the rolls will become plugged, not only by the particular joint, but by the remainder of the vine or stalk and successive vines and stalks which would pile up and completely obstruct the machine.

To maintain the cleaning or fruit picking rolls in a properly cleared condition it has frequently been necessary for an additional operator to be present to clear the rolls by hand. In order to reduce the expense of the additional operator, the following means and method are provided.

It is therefore an object of the invention to provide a vine crop harvester for handling vines or stalks with enlarged asymmetrical branch joints wherein, when one of the enlarged joints presents its larger dimension to the bight of the rolls transversely of the rolls, it can be dislodged in a reversed direction by relatively short interval reverse rotation of the rolls followed by resumption of forward feeding rotation thereof. During the reversal and resumption of forward rotation, the stalks are supported above the rolls so that the remainders of the stalks to be fed to the rolls are supported for free chance rotation. The natural imbalance of rotational weight distribution about the main stalk, the weight of the fruit and at times, cross-sectional irregularities in the shape of the stalk itself as the latter is gripped by the rolls, will result in a highly satisfactory rotational shift of a particular stalk joint so that the joint will pass between the rolls without jamming. The machine is also capable of removing accumulations of weeds and trash which tend to clog the rolls.

The above and other objects and advantages of the invention will more fully appear from the following description in connection with the accompanying drawings.

Figure 1:
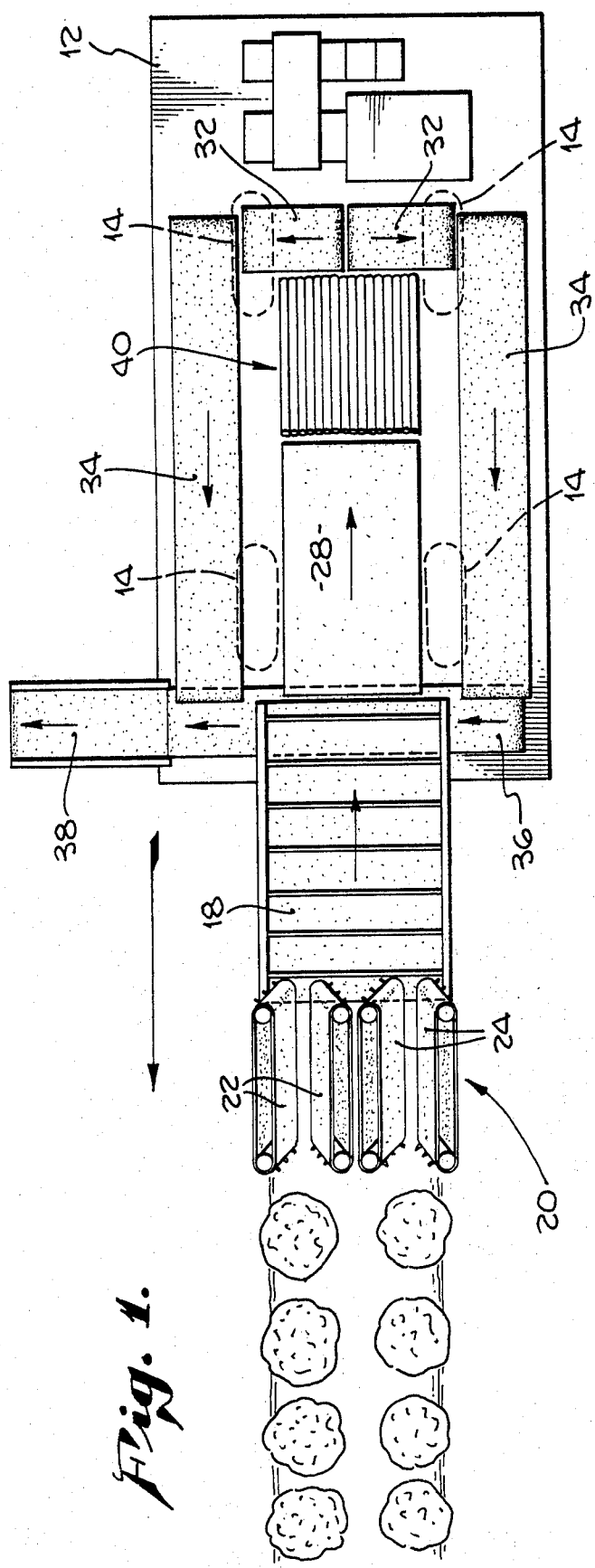
FIG. 1 is a plan view of an embodiment of the invention.
Figure 2:
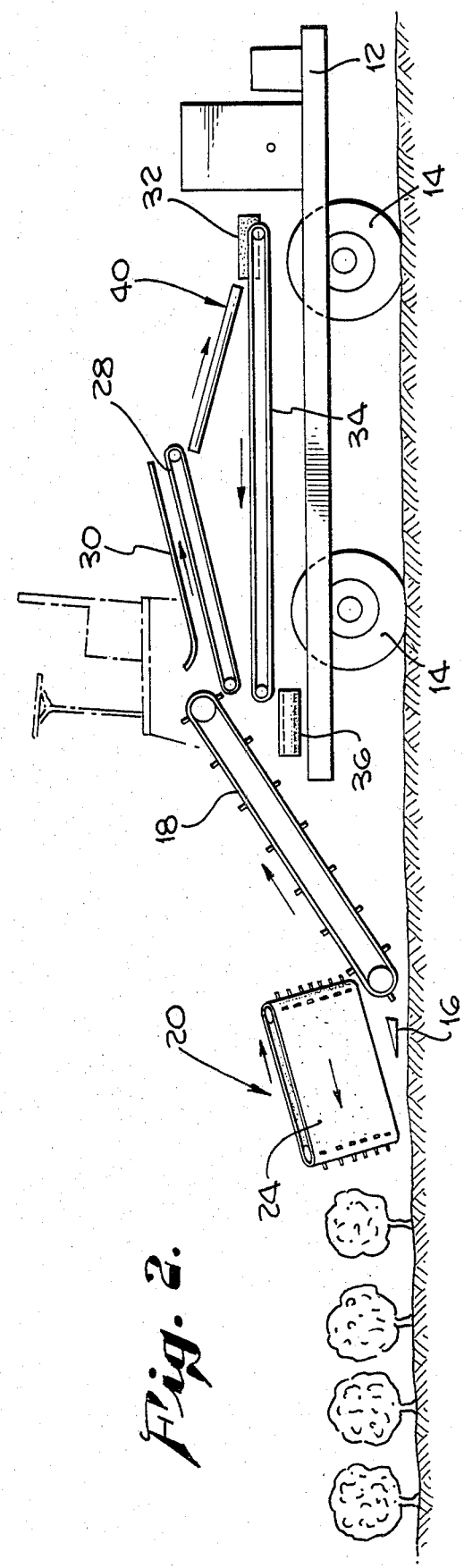
FIG. 2 is a side elevational view.
Figure 3:
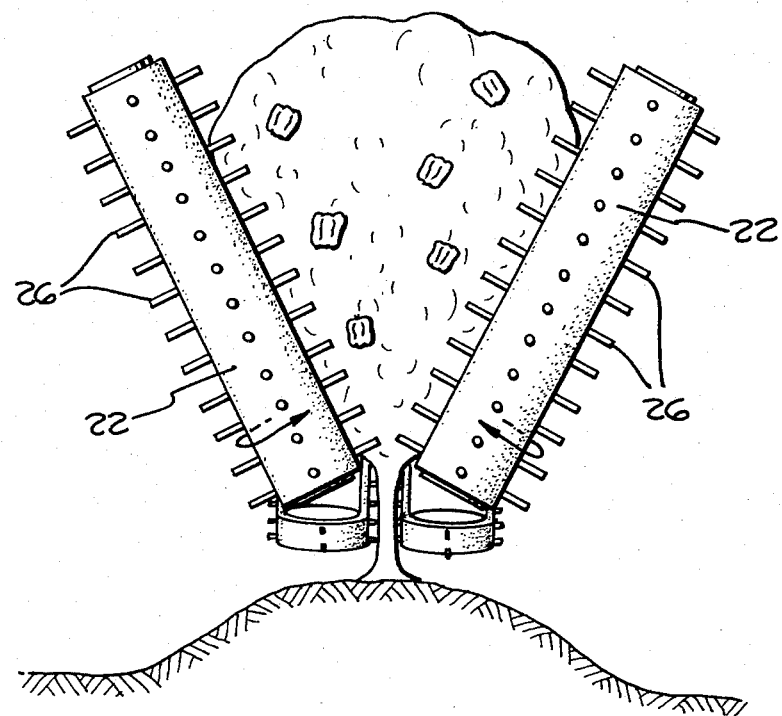
FIG. 3 is an enlarged front elevational view of the gathering mechanism of the harvester.
Figure 4:
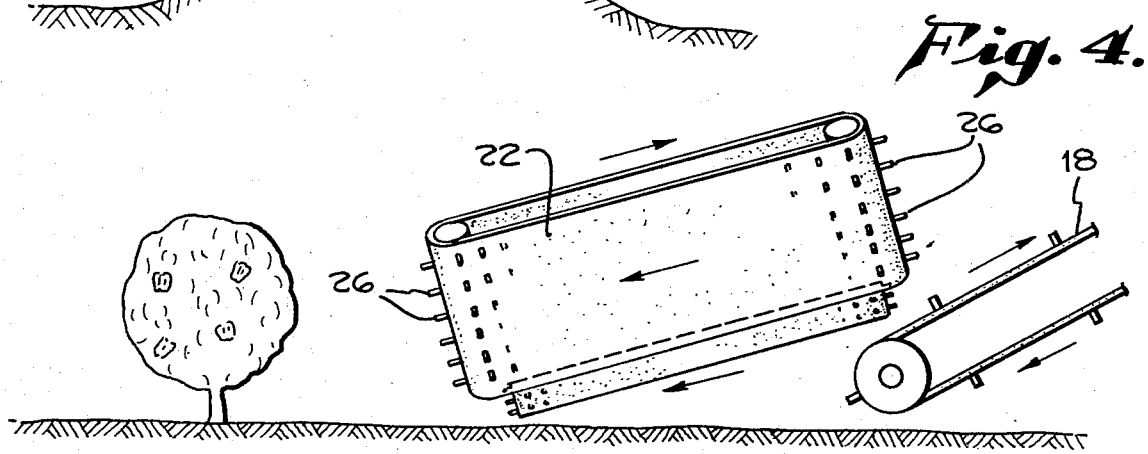
FIG. 4 is a side elevational view, on a reduced scale, of the gathering mechanism of FIG. 3.
Figure 5:
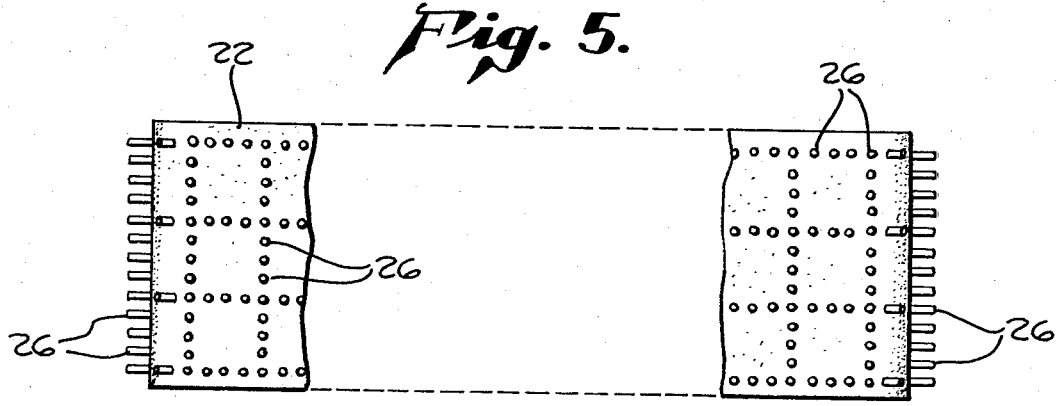
FIG. 5 is a plan view, with portions broken away of one of the gathering conveyor belts.

An example of a vine crop harvester is shown in FIGS. 1 and 2 with a frame 12 supported by wheels 14. The details of the various supports for the several elements of the harvester on the frame are not shown, but as will be understood by persons skilled in the art, the forward portion of the frame supports suitable crop cutting means indicated at 16 and upwardly and rearwardly disposed elevating conveyor 18. Supported adjacent the forward lower end of the elevating conveyor 18 is gathering mechanism 20 shown with pairs of gathering belts 22 and 24. The belts of each pair converge downwardly as illustrated in FIG. 3 and each pair of belts also extend upwardly and rearwardly as shown in FIGS. 2 and 4. The individual belts of the gatherer preferably are provided with pegs or rods 26 which, as illustrated in FIG. 5, are arranged in open squares large enough to accommodate the bell peppers or other fruits in the squares and hold them against falling.

It is contemplated that the gathering belts 22 and 24 be so arranged with their above described angular arrangement that the branches of individual vines would be drawn together and elevated with a nearly vertical upward movement so they can be properly deposited upon the elevating belt conveyor 18.

The vines feed from the elevating belt to a draper which includes a belt 28 above which is disposed a draper or spreader plate 30 which rather lightly presses the vines into a loose relatively wide layer which then feeds onto the upper ends of a plurality of cleaning rolls 40, the latter being adapted for removing the vine crops from the vine and separating the crop and vines so that the crop can be deposited upon laterally outwardly feeding conveyors 32, each of which feeds to the rear end of a forwardly moving upper run of a conveyer 34 at each side of the frame 12. The side conveyors 34, at their forward ends, deposit the fruit upon a laterally moving conveyor 36 having an upwardly slanting lateral extension 38 for depositing the fruit in a truck or wagon moving through the field alongside the harvester.

The fruit picking or cleaning rolls are indicated generally at 40 in FIGS. 1 and 2. They are arranged to operate in complementary pairs 42, each pair being made up of a roller 44 and a roller 46.

Figure 10:
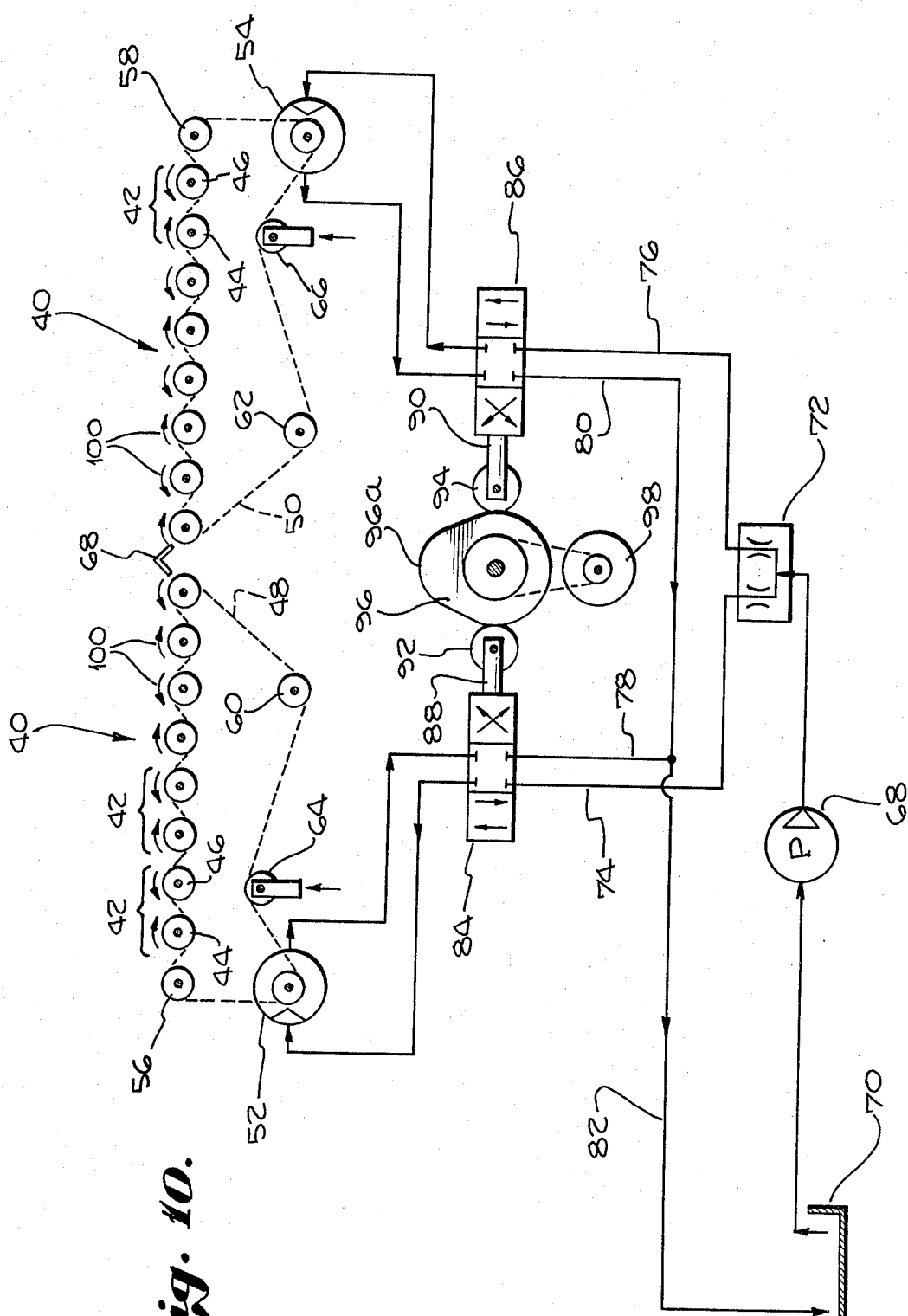
FIG. 10 is a diagramatic view showing sets of fruit cleaning or picking rolls, a hydraulic drive therefor and intermittent roll reversing mechanism.

As shown in FIG. 10, the rollers 30 are in two sets, each set being driven by a respective drive chain 48 and 50. Chain 48 is driven by a hydraulic motor 52 and chain 50 by a similar hydraulic motor 54. From the motors 52 and 54 the drive chain extend over idlers 56 and 58 and thence alternatively over and under the cleaning rolls 44, 46, about idler rollers 60 and 62 and over chain tensioners 64, 66. The left and right groups of rolls 40 may, if desired, be separated by an inverted V-shaped divider 68 to prevent vines or fruit from falling between the adjacent rollers of the two groups.

The hydraulic motors 52 and 54 are operated by a pump 68 which pumps fluid from a reservoir 70 through a flow divider 72 and thence through a pressure line 74 to the hydraulic motor 52 and through the pressure line 76 to the motor 54. Each motor 52 and 45 has a return flow line 78, 80, respectively merging in a single return line 82 which leads to the reservoir 70. The pressure lines 74 and 76 to the two hydraulic motors and their complementary return lines 78 and 80 extend through directional control valves 84 and 86, respectively. These valves are shown diagramatically with operating plungers 88 and 90 provided with cam following rollers 92 and 94 which are suitably biased towards an intermediate cam 96. This cam may be driven by a suitable constant speed motor 98.

The cam 96 is shown in FIG. 10 in a neutral position. When in operation, it may rotate in a clockwise direction as viewed in that figure and indicated by the arrow. It will be seen that, as the cam rotates, it will alternately actuate the directional control valves 86 and 84, and in so doing, alternately reverse the rotation of the hydraulic motors 54 and 52, respectively. This will cause the cleaning rolls 44, 46 of each pair to reverse direction.

It will be noted that the cam following rollers 92 and 94 of the directional flow control valve operators 88 and 90 dwell on the low portion of the cam 96 through a considerably greater interval than upon the projecting cam lobe 96a. This will cause the directional control valves to provide normal pressure flow through lines 74 and 80 to rotate the motors 52 and 54 so that the rolls 44 and 46 of each pair will rotate in the direction of their irrespective arrows 100. As viewed in FIG. 10, when vines are deposited upon the rolls 40, they will be caught and fed between a roll 44 moving clockwise and a roll 46 moving counterclockwise. Then when one of the cam follower rollers 92 or 94 rides the lobe 96a of the cam 96, the rolls 44 and 46 of each pair will be reserved for an interval which is considerably shorter than the interval provided for feeding and progressing the vines between said rolls.

FIGS. 6 through 9 shown in enlarged cross-section a typical pair of cleaning rolls 44 and 46, illustrating the manner in which they operate to strip the fruit from the vines and also the manner in which they free themselves from becoming clogged by enlarged vine joints when the rolls are momentarily reversed.

Each roll 46 is provided with a plurality of radially projecting elastomeric fingers 102, the outer ends of which are approximately in light contact with the surface of the companion roll 44, the latter preferably being made of a readily flexible elastomeric material, preferably rubber.

Figure 6:
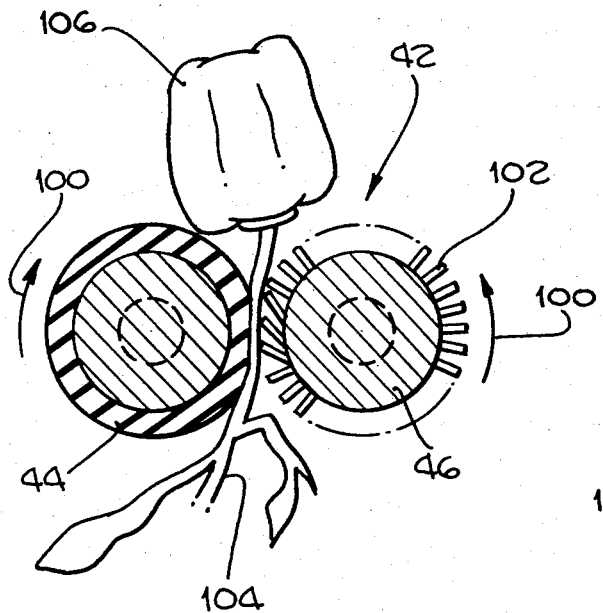
FIG. 6 is an enlarged sectional view through a pair of crop cleaning rolls showing a bell pepper prior to its removal from the vine.
Figure 7:
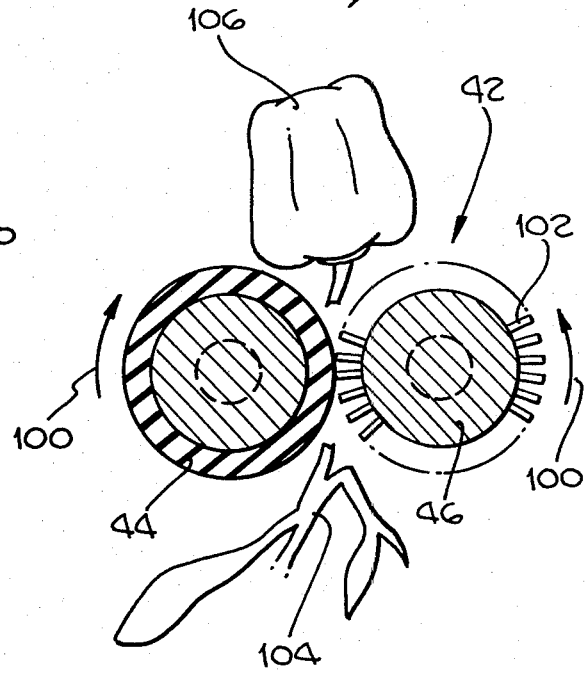
FIG. 7 is a view similar to FIG. 6 showing the bell peppers with a short stem as it is broken from the remainder of the vine.

Vines fed on top of the cleaning rolls 44 and 46 from the draper conveyor 29 fall into the bight defined by a pair of rolls 44 and 46, are engaged by the rubber fingers 102 and soft rubber back-up roll 44 and pulled between the rolls. In FIG. 6 there is shown a section of vine 104 with a fruit 106 still attached thereto and approaching the rolls, the rotation of which is indicated by the arrows 100. As the rolls continue to rotate, a few more degrees, the fruit 106 will contact the rolls, and by reason of its relative size, is prevented from passing between the rolls, whereupon the vine 104 will break off as indicated, the fruit then rolling down the rolls slanted as shown in FIG. 2, and the fruit then carried off by the above described conveyors.

Figure 8:
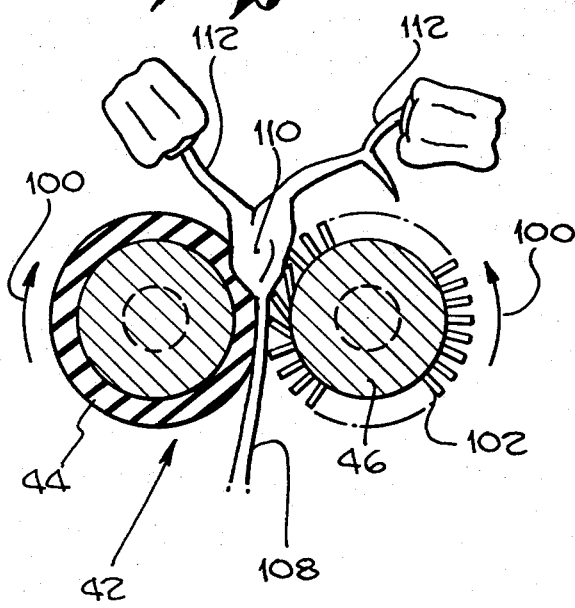
FIG. 8 is a sectional view of the rolls of FIGS. 6 and 7 showing the manner in which the enlarged lateral dimension of a stem joint is caught in the bight of the rolls.

In FIG. 8, there is shown a pair of rolls 44 and 46 with a section of vine 108 and illustrating a considerable enlargement at the joint 110 at the point where two stems 112 meet. The enlargement of the joint 110 is asymmetrical, being greater in a plane through the tube stems 112 than at right angles thereto.

When a joint 110 is in the position of FIG. 8 it is too large to pass between the rolls 44 and 46, the vine 108 will cease to feed between the rolls and will catch vines which follow and will clog the machine. However, the rolls are periodically reversed as described in connection with FIG. 10 with the directional control valves 84 and 86 and the control cam 96. It has been found that when the pairs of rolls 44 and 46 are reversed, the vines will rotate more or less about their lengths for various reasons, such as the rotational weight imbalance of the plant stalk, its branches and fruit, circumferential irregularities in the stalk and its branches, and the feeding motion and contact with other plant stalks being fed.

Figure 9:
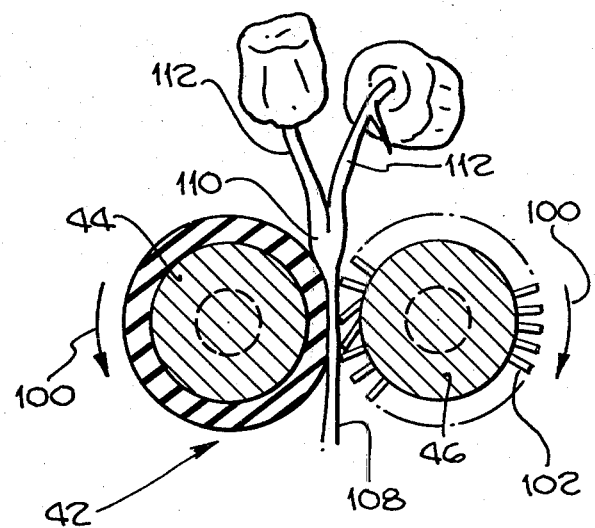
FIG. 9 is a cross-section through the rolls illustrating the branch or stem with its enlarged joint backed away from the rolls by reversing rotation.

FIG. 9 illustrates a change of position which can occur from the position of FIG. 8 due to one or more of the above-recited causes. It will be noted in FIG. 9 that the transverse diameter of the joint 110, as it is viewed, is considerably less than as it is view in FIG. 8. It will therefore feed freely between the rolls 44 and 46 as desired.

It is not to be expected that an enlarged plant joint 110 will shift rotationally from a position such as shown in FIG. 8 to one such as illustrated in FIG. 9 upon each and every reversal of the rolls 44 and 46. Sometimes this will occur during a single reverse cycle and return to the forward feed but at other times it may take two or more roll reversals before the enlarged joint will feed between them properly. However, it has been found that the feeding of the vines between the rolls with the accompanying cleaning or detachment of the fruit is accomplished in a highly efficient manner without damage to the fruit and without clogging of the machine to the point where it will not operate dependably.

It will, of course, be understood that various changes can be made in the form, details and arrangement of the various parts and the precise operation of the method without departing from the spirit of the invention.

What is claimed is:

1. In a vine crop harvester,
   an ambulatory frame,
   a plurality of crop cleaning rolls supported by said frame and having spaced cylindrical surfaces,
   the diameter of the crop cleaning rolls being less than the length of the crop stalks from which the crop is to be cleaned, drive means for said rolls adapted to rotate adjacent rolls of a pair in opposite directions to grip and feed crop stalks downwardly between them and strip the fruit from the stalks, there being sufficient space between adjacent rolls of a pair to grip and feed stalks of the crop to be cleaned but insufficient space to pass widened joints of the stalks, and means for cyclically reversing the rotation of adjacent rolls of a pair sufficiently to move widened stalk joints which have been caught in the bight of the rolls upwardly away from the rolls for reintroduction to the rolls upon resumption of the downward progressive rotation of said rolls.

2. The structure in claim 1, and said rolls being so disposed that upwardly projecting portions of said stalks which have not yet reached said rolls are free and unconfined.

3. A method of cleaning vine crop fruits having stalks and branches with enlarged asymmetrical cross-sectional joints which includes:

feeding the stalks with their fruit thereon between pairs of oppositely rotating rolls having cylindrical surfaces spaced sufficiently to grip and feed the unjointed length of stalks downwardly therethrough, the spacing between the rolls being insufficient to pass the larger cross-sections of said joints, periodically reversing the rotation of said rolls releasing any stalk joints caught in the bight of the rolls, and said stalks and their joints, at the inlet side of the rolls, during the reversing and the subsequent downward feeding rotation of said rolls, being supported therebetween the rolls for free chance rotation prior to reintroduction of successive portions of the stalks to said rolls.

4. A method of cleaning vine crop fruits from vines with stalks and branches having cross-sectionally asymmetrical shapes at the junctures of the stems with the stalks which includes:

feeding the stalks with fruit thereon between downwardly feeding, oppositely rotating rolls capable of gripping and feeding the stalks but having cylindrical surfaces too closely spaced to accommodate the fruit and the greater dimensions of the asymmetrical stalk joints, intermittently reversing said rolls to reverse the movement of said stalks releasing any stem junctures caught in the bight of the rolls, supporting the stalks therebetween the rolls in freestanding condition for free chance rotation thereof prior to their reintroduction of the bight between the rolls.

5. The method of claim 4, and rotating the rolls forwardly and reversely through different time intervals, the interval of reverse rotation being shorter than the interval of downward rotation, and the total movement of the stalks being intermittently downward.

6. The method of claim 4, and the free chance rotation of said stalks being induced in part by the reversed extension of the stalks and also by the natural rotationally imbalanced weight of the stalk, its branches and the fruit.

7. The method of claim 4, and the free chance rotation of said stalks being induced, in part, by cross-sectional irregularities in the stalks when they encounter the rolls.

* * * * *